(No Model.)

G. J. TAYLOR.
TREADLE FOR PEDOMOTORS.

No. 323,085. Patented July 28, 1885.

Witnesses:
C. E. Sundgren
Emil Horter

Inventor:
George John Taylor
by his Attys
Brown & Hall

N. PETERS, Photo-Lithographer, Washington, D. C.

UNITED STATES PATENT OFFICE.

GEORGE J. TAYLOR, OF SALT LAKE CITY, UTAH TERRITORY.

TREADLE FOR PEDOMOTORS.

SPECIFICATION forming part of Letters Patent No. 323,085, dated July 28, 1885.

Application filed April 30, 1885. (No model.)

*To all whom it may concern:*

Be it known that I, GEORGE JOHN TAYLOR, of Salt Lake City, in Salt Lake county, and Territory of Utah, have invented a new and useful Improvement in Treadles for Pedomotive Vehicles and Machines, of which the following is a specification.

My invention is more particularly intended for bicycles and other pedomotive carriages; but it may also be embodied in machinery operated by the foot and in which is employed a crank having upon it a foot-pedal.

My invention relates to that class of vehicles in which the pedals are not carried directly by the crank-pins, but are attached to the ends of levers which are connected between their ends with the crank-pins, and are jointed at their opposite ends to suitable supports.

The invention consists in a novel combination of parts hereinafter described, and pointed out in the claim.

Figure 1:
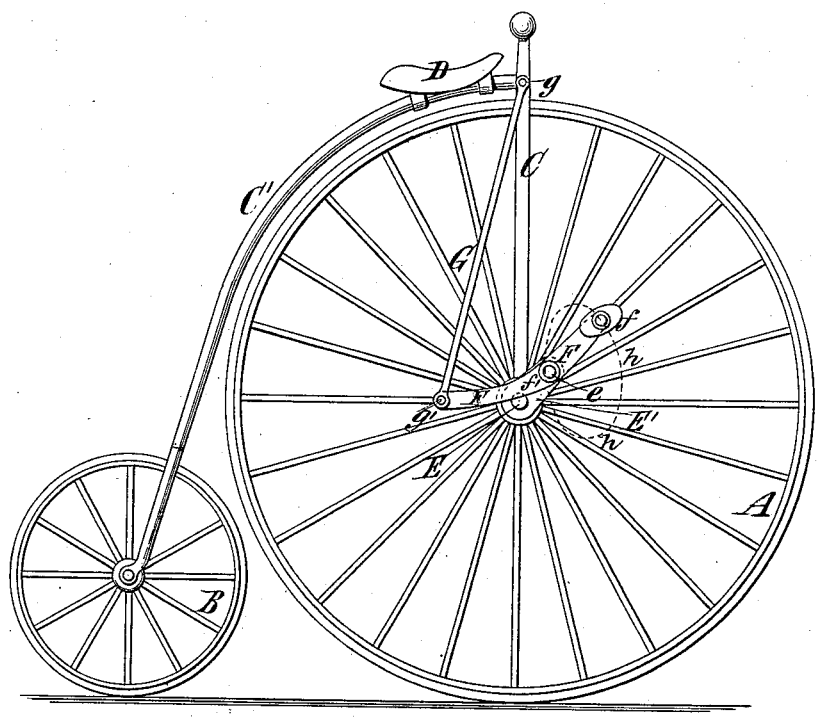
Figure 2:
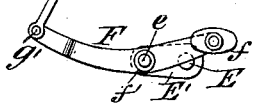
Figure 3:
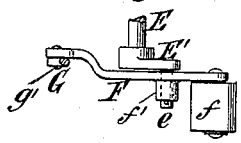

In the accompanying drawings I have represented a bicycle having my improved treadle mechanism applied thereto. Figure 1 is a side view of the machine, showing the crank upon its downstroke. Fig. 2 represents the crank and pedal-lever in the position which they occupy when the crank is upon its up or return stroke; and Fig. 3 represents a plan of the crank with its pedal and pedal-lever.

Similar letters of reference designate corresponding parts in the several figures.

A B designate, respectively, the main driving-wheel and the steering-wheel of a bicycle having a fixed frame, C, and backbone C'. D designates the seat for the rider. All these parts may be of any ordinary or suitable construction, and my invention does not in any wise relate to them.

E designates the main driving-shaft or crank-shaft of the machine, which has secured upon its opposite ends cranks E', as is usual in machines of this class. Each crank has an outwardly-projecting pin, $e$, and supported thereon is a lever, F, which extends rearward some little distance from the driving-shaft, and has a swinging fulcrum-support, consisting of a rod or link, G, pivoted at its upper end, at $g$, to a portion of the fixed frame of the machine, and having its lower end, $g'$, pivotally connected with the rear end of the lever F. The lever F is entirely supported by the swinging link G and crank-pin $e$, and is free to move up and down or back and forth as the crank-pin changes its position during the revolution of the shaft. The lever F projects considerably forward of the crank-pin $e$, and at its forward end is provided with a pedal, $f$, upon which the foot of the rider operates, instead of upon the crank-pin, as is usual.

When in the position shown in Fig. 1, it will be seen that the lever F forms, in effect, an extension of the crank, and the foot of the rider in the downward or working movement of the crank has, therefore, about twice the leverage that it would have were the pedal arranged upon the crank-pin $e$, as is usual. The leg movement of the rider is not, however, proportionately increased, and is only about the same as when the pedal is situated upon the crank-pin. The free connection between the crank-pin $e$ and the lever F permits the lever to move upward or downward as the crank rotates, and the swinging support which is afforded by the rod G permits of the lever F moving backward and forward during such rotation of the crank. I have represented by a dotted line, $h$, in Fig. 1, the path which the pedal will have during the complete revolution of the crank.

Fig. 1 represents the parts in the position which they occupy when the crank is upon its down or working stroke, and Fig. 2 represents the same parts in the position which they occupy when the crank is upon its upward or return stroke.

In order to prevent any canting of the lever F when the pressure of the foot is upon it, I give the crank-pin $e$ a long bearing in the hub or boss $f'$, cast or otherwise formed upon or secured to the lever F, as shown in Fig. 3.

My invention is very simple, and adds but little to the cost of the machine. It may, if desired, be applied with little trouble and expense to existing machines which now have the pedals situated upon the crank-pins, and by it I obtain a long leverage for the foot in the downward or working stroke of the crank without a leg movement proportionately great.

It will be understood that each of the cranks at the two sides of the machine is provided with a lever similar to that here described.

I am aware that it is not new to attach the pedals to levers which are supported between their ends upon the crank-pins and are jointed to suitable supports at their ends; and I do not therefore claim this, broadly, as of my invention. My invention differs from the old machines of which I have knowledge in that the levers F are jointed at their ends to suitable supports, G, and project considerably forward of the crank-pins, and the pedals $f$ are attached to the forward ends of the levers in front of the crank pins. When the parts are thus combined, the pedals operate with long and powerful down strokes and with comparatively short up strokes, as will be understood from the dotted diagram in Fig. 1. The pedals being at the forward ends of the levers F and the seat behind the center of the driving-wheel A, the power may be most effectively applied, and the long swinging links or rods G afford an easy support to the levers, and enable them to operate with little friction.

What I claim as my invention, and desire to secure by Letters Patent, is—

The combination, with the driving-wheel A, main frame C, axle, and driving-crank of a bicycle or other pedomotive vehicle, of a seat, D, supported in rear of the main frame, the levers F, attached between their ends to the crank-pins and projecting forward of the crank-pins, swinging links or rods G, extending from the upper part of said frame downward and rearward and jointed to the rear ends of the levers F, and pedals $f$, attached to the forward ends of the said levers forward of the crank-pins, substantially as herein described.

GEORGE J. TAYLOR.

Witnesses:
WM. J. SILVER,
JAMES BARTON.